United States Patent [19]

Sakamoto et al.

[11] Patent Number: 4,512,729
[45] Date of Patent: Apr. 23, 1985

[54] DRIVE BEARING DEVICE FOR A FLUID DISPLACEMENT APPARATUS

[75] Inventors: Seiichi Sakamoto, Gunma; Kiyoshi Terauchi, Isesaki, both of Japan

[73] Assignee: Sanden Corporation, Gunma, Japan

[21] Appl. No.: 433,796

[22] Filed: Oct. 12, 1982

[30] Foreign Application Priority Data

Oct. 12, 1981 [JP] Japan .................. 56-162214

[51] Int. Cl.³ .............. F01C 1/02; F01C 21/02; F16C 19/16; F16C 19/49
[52] U.S. Cl. ............................ 418/55; 418/151; 384/452; 384/548
[58] Field of Search .............. 418/55, 57, 59, 151; 308/174, 175, 202; 384/126

[56] References Cited

U.S. PATENT DOCUMENTS

| | | | |
|---|---|---|---|
| 980,426 | 1/1911 | Lockwood | 308/174 |
| 2,118,767 | 5/1938 | Proffitt | 308/174 |
| 3,302,986 | 2/1967 | Grolman et al. | 308/174 |
| 3,377,846 | 4/1968 | De Coye De Castelet | 418/151 |
| 3,884,599 | 5/1975 | Young et al. | 418/55 |
| 4,129,405 | 12/1978 | McCullough | 418/55 |

FOREIGN PATENT DOCUMENTS 535830 1/1957 Canada .................. 384/453
623229 12/1935 Fed. Rep. of Germany ........ 418/59

Primary Examiner—John J. Vrablik
Attorney, Agent, or Firm—Banner, Birch, McKie & Beckett

[57] ABSTRACT

A fluid displacement apparatus is disclosed which includes a housing having a front end plate, a fixed fluid displacement member and an orbiting fluid displacement member. The fixed and orbiting members interfit to make a plurality of line contacts to define sealed off fluid pockets. A driving mechanism, including a drive shaft, is disposed within the housing and is connected to the orbiting member to effect orbital motion of the orbiting member upon rotation of the drive shaft. The drive shaft is rotatably supported by the front end plate through an angular bearing disposed within the front end plate. The pressure cone apex of the angular bearing coincides with the driving point of the orbiting member. A thrust race is disposed on one axial end surface of the angular bearing, and a ring plate is disposed within the front end plate facing the thrust race at a predetermined axial distance. A thrust bearing is placed in the axial gap between the thrust race and the ring plate to carry the thrust force from the angular bearing.

6 Claims, 5 Drawing Figures

DRIVE BEARING DEVICE FOR A FLUID DISPLACEMENT APPARATUS

BACKGROUND OF THE INVENTION

This invention relates to a fluid displacement apparatus, and more particularly, to a fluid compressor or pump of the type which utilizes an orbiting fluid displacement member.

Several types of fluid displacement apparatus are known which utilize an orbiting fluid displacement member driven by a Scotch yoke type shaft coupled to an end surface of the fluid displacement member. One such apparatus, which is disclosed in U.S. Pat. No. 1,906,142 issued to John Ekelof, is a rotary machine provided with an annular and eccentrically movable piston adapted to act within an annular cylinder with a radial transverse wall. One end of the wall of the cylinder is fixedly mounted and the other wall consists of a cover disc connected to the annular piston. The piston is driven by a crank shaft. Another prior art apparatus, which is shown in U.S. Pat. No. 801,182, issued to Creux, utilizes orbiting and fixed scrolls as the fluid displacement members.

Though the present invention applies to either a piston type or scroll type of fluid displacement apparatus, i.e., using either a movable annular piston or an orbiting scroll, the description which follows will be limited to a scroll type compressor. The term fluid displacement member is used generically to describe a movable member of any suitable configuration in a fluid displacement apparatus.

The scroll type apparatus shown in the Creux patent, U.S. Pat. No. 801,182, includes two scroll members each having an end plate and a spiroidal or involute spiral element. These scroll members are maintained angularly and radially offset so that both spiral elements interfit to make a plurality of line contacts between their spiral curved surfaces to seal off and define at least one pair of fluid pockets. The relative orbital motion of the scroll members shifts the line contacts along the spiral curved surfaces so that the fluid pockets change in volume. The volume of the fluid pockets increases or decreases dependent on the direction of the orbital motion. Thereof, this scroll type fluid apparatus is applicable to compress, expand or pump fluids.

Typically, in a scroll type apparatus, a drive shaft receives and transmits a rotary driving force from an external power source. The drive shaft is rotatably supported by a bearing disposed within a housing. In particular, as shown in U.S. Pat. No. 3,874,327, the drive shaft is rotatably supported by two bearings disposed within the housing.

Referring now to FIG. 1, a prior art shaft support construction will be described. Drive shaft 13', which includes a disk shaped rotor 131' at its inner end portion, is rotatably supported by first bearing 19' disposed within sleeve 17' projecting from front end plate 11'. Disk shaped rotor 131' also is rotatably supported by second bearing 16' disposed within opening 111' of front end plate 11'. A crank pin or drive pin axially projects from an end surface of disk shaped rotor 131', and is radially offset from the center of drive shaft 13'. The drive pin is connected to an orbiting scroll for transmitting orbital motion from drive shaft 13' to the orbiting scroll. The orbiting scroll is coupled to a rotation preventing device so that the orbiting scroll undergoes orbital motion upon rotation of drive shaft 13'.

Scroll type fluid displacement apparatus of the above type is suited for use as a refrigerant compressor of an automobile air conditioner. Generally, the compressor is coupled to an electromagnetic clutch for transmitting the output of the engine to the drive shaft of the compressor. The magnetic clutch comprises a pulley 22', magnetic coil 23' and armature plate 24'. Pulley 22', which is usually rotated by the output of the engine, is rotatably supported by sleeve 17' through bearing 21' disposed on the outer surface of sleeve 17'. Magnetic coil 23' is mounted on the outer surface of sleeve 17' by a support plate and armature plate 24' is elastically supported on the outer end portion of drive shaft 13'.

In the construction shown in FIG. 1, drive shaft 13' and disk shaped rotor 131' are generally supported by two bearings 16' and 19' which are axially spaced. Since bearing 16' is placed on front end plate 11' at a position which is axially spaced from the driving point of the orbiting scroll, bearing 16' carries a great load during orbital motion of the orbiting scroll. The other support bearing 19' is positioned inside sleeve 17' so that the diameter of sleeve 17' must be enlarged, which in turn increases the outer diameter of the magnetic clutch which is disposed on the outer surface of sleeve 17'. Furthermore, because sleeve 17' extends from an end surface of front end plate 11', it must be cantilevered, which requires a sleeve with considerable mechanical strength. Also, because the tensile force of the belt is transmitted to sleeve 17' through pulley 22' and bearing 21', the thickness of sleeve 17' must be limited so that the diameter of bearing 21' which supports the pulley 22' cannot be decreased. These physical constraints result in a larger outside diameter of the compressor itself.

Furthermore, scroll type compressors usually are provided with first balance weights to cancel the centrifugal force due to the orbital motion of the orbiting scroll and other balance weights to cancel the moment which arises from the operation of the first balance weights. Therefore, another physical constraint in designing the compressor is the necessity for arranging these balance weights.

SUMMARY OF THE INVENTION

It is a primary object of this invention to provide a fluid displacement apparatus with improved durability of the supporting mechanism for the drive shaft.

It is another object of this invention to provide a fluid displacement apparatus wherein the radial and axial dimensions of the apparatus are inherently reduced.

It is still another object of this invention to provide a fluid displacement apparatus wherein the durability and reliability of the apparatus is improved.

It is yet another object of this invention to provide a fluid displacement apparatus which accomplishes the above described objects, yet is simple in construction and can be readily manufactured. In this regard, it is an object of this invention to provide a fluid displacement apparatus with an improved bearing device for the drive mechanism which reduces the number of bearings and simplifies the construction of balance weights.

A fluid displacement apparatus according to this invention includes a housing having a front end plate, a fixed fluid displacement member fixedly disposed relative to the housing and an orbiting fluid displacement member cooperating with the fixed member to compress or pump fluid. The orbiting member is driven by a drive shaft which protrudes through the front end plate and is rotatably supported by an angular bearing. The pressure cone apex of the angular bearing coincides with the driving point of the orbiting member. A thrust race is disposed on an axial end surface of the angular bearing and a ring plate is disposed in the housing axially spaced from the thrust race. A thrust bearing is placed between the thrust race and the ring plate for carrying the axial force component from the angular bearing.

One aspect of this invention is directed to a scroll type compressor which includes a housing having a front end plate. A fixed scroll is fixedly disposed relative to the housing and has an end plate from which a first wrap extends into the interior of the housing. An orbiting scroll has an end plate from which a second wrap extends. The first and second wraps interfit at an angular and radial offset to make a plurality of line contacts to define at least one pair of sealed off fluid pockets.

A driving mechanism for the orbiting scroll of the scroll type compressor includes a drive shaft which protrudes through the front end plate and is rotatably supported thereby to effect orbital motion of the orbiting scroll by rotation of the drive shaft. Rotation of the orbiting scroll is prevented so that the fluid pockets between the first and second wraps change volume by the orbital motion of the orbiting scroll.

The drive shaft is rotatable supported by the housing through an angular bearing. The pressure cone apex of the angular bearing coincides with the driving point of the orbiting scroll. A thrust race is disposed on the axial end surface of the outer surface of the angular bearing. A ring plate, which faces the thrust plate, is mounted on the drive shaft. A thrust bearing is placed between the thrust plate and the ring plate to carry the axial force component from the angular bearing.

Further objects, features and other aspects of this invention will be understood from the following detailed description of the preferred embodiments of this invention referring to the annexed drawings.

DETAILED DESCRIPTION OF THE PREFERRED EMBODIMENTS

Figure 1:
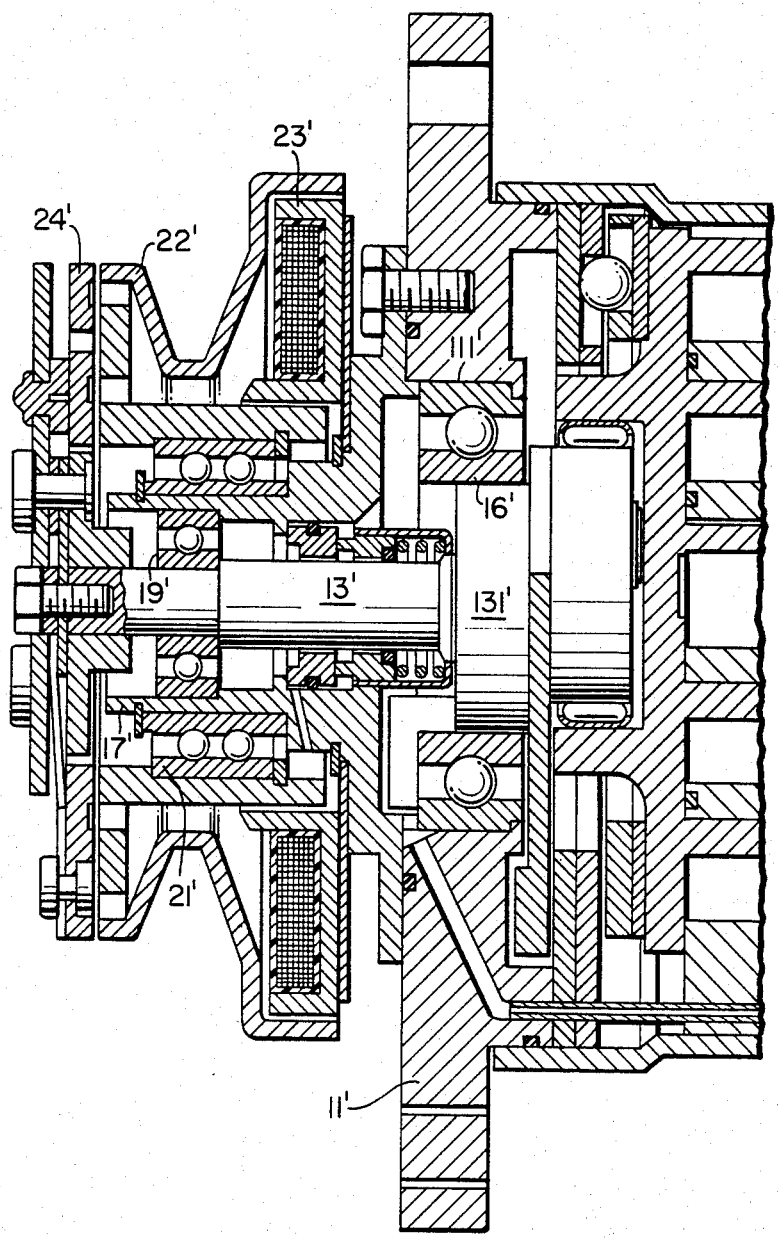
FIG. 1 is a vertical sectional view of the main portion of a prior art drive shaft supporting mechanism.
Figure 2:
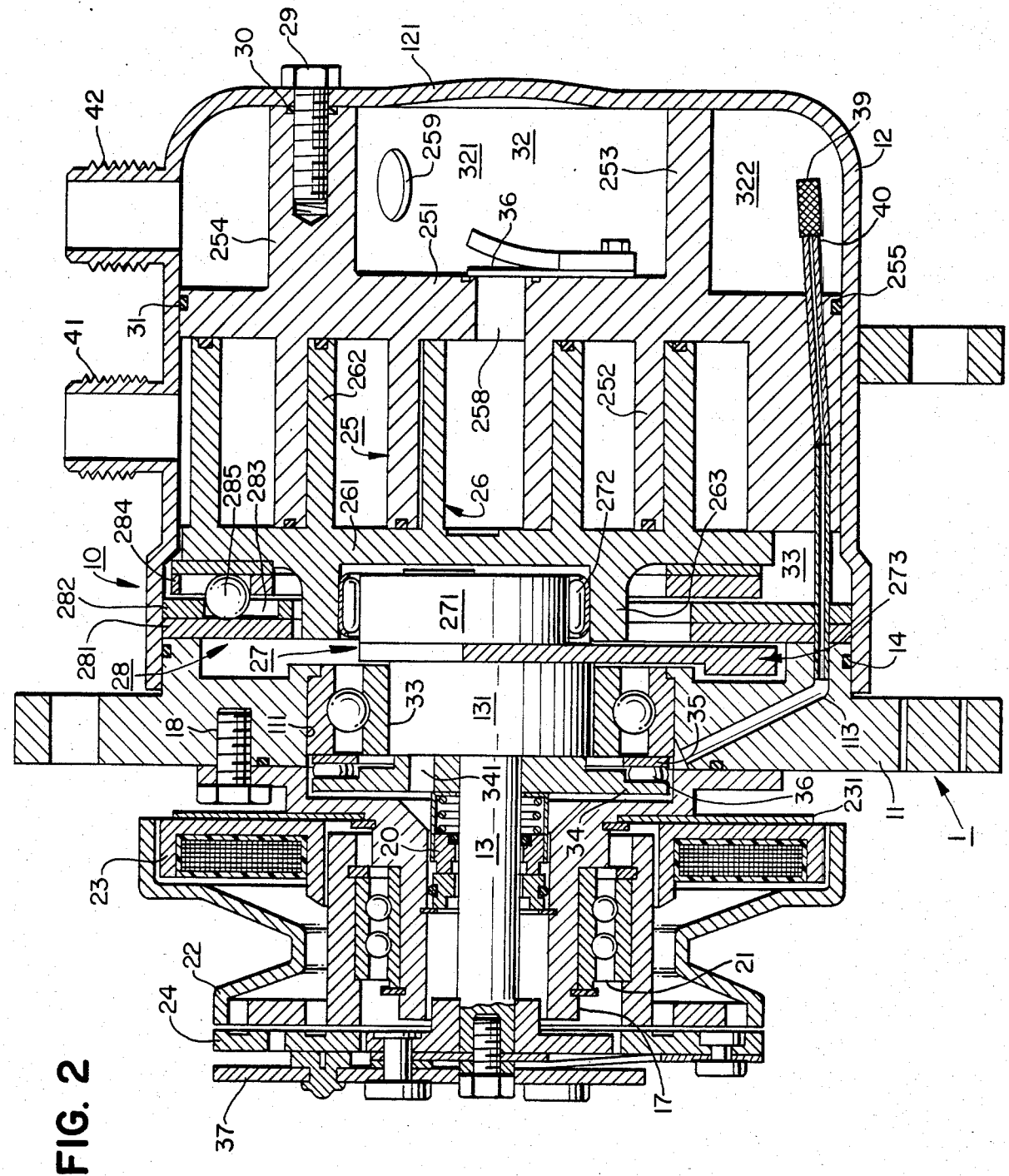
FIG. 2 is a vertical sectional view of a scroll type compressor according to one embodiment of this invention.

Referring to FIG. 2, a fluid displacement apparatus in accordance with the present invention is shown in the form of scroll type refrigerant compressor 1. Compressor 1 includes compressor housing 10 comprising front end plate 11 and cup shaped casing 12 fastened to an axial end surface of front end plate 11. Opening 111 is formed at the center of front end plate 11 for supporting drive shaft 13. Annular projection 112, concentric with opening 111 is formed on the rear end surface of front end plate 11 facing cup shaped casing 12. An outer peripheral surface of annular projection 112 bites into the inner wall of opening 111 of cup shaped casing 12. Cup shaped casing 12 is fixed on the rear end surface of front end plate 11 by a fastening device (not shown), so that the opening of cup shaped casing 12 is covered by front end plate 11. An O-ring 14 is placed between the outer peripheral surface of annular projection 112 and the inner wall of opening 111 of cup shaped casing 12 to seal the mating surface between front end plate 11 and cup shaped casing 12. Front end plate 11 has an annular sleeve 17 projecting from the front end surface of front end plate 11. This sleeve 17 surrounds drive shaft 13 to define a shaft seal cavity. Shaft seal assembly 20 is assembled on drive shaft 13 within the shaft seal cavity. As shown in FIG. 2, sleeve 17 is attached to front end plate 11 by screws 18. An O-ring is placed between the front end surface of front end plate 11 and sleeve 17 to seal the mating surface between front end plate 11 and sleeve 17. Alternatively, sleeve 17 may be formed integral with front end plate 11.

Pulley 22 is rotatably supported by sleeve 17 through bearing 21 disposed on the outer surface of sleeve 17. Electromagnetic coil 23, which is received in an annular cavity of pulley 22, is mounted on the outer surface of sleeve 17 by support plate 231. Armature plate 24 is elastically supported on the outer end portion of drive shaft 13 which extends from sleeve 17. A magnetic clutch is formed by pulley 22, magnetic coil 23 and armature plate 24. Thus, drive shaft 13 is driven by an external power source, for example, the engine of a vehicle, through a rotation transmitting device such as the above described magnetic clutch.

A number of elements are located within the inner chamber of cup shaped casing 12 including fixed scroll 25, orbiting scroll 26, driving mechanism 27 for orbiting scroll 26 and rotation preventing/thrust bearing device 28 for orbiting scroll 26. The inner chamber of cup shaped casing 12 is formed between the inner wall of cup shaped casing 12 and the rear end surface of front end plate 11.

Fixed scroll 25 includes circular end plate 251, wrap or spiral element 252 affixed to or extending from one end surface of circular end plate 251, and annular partition wall 253 axially projecting from the end surface of end plate 251 on the side opposite spiral element 252. Annular partition wall 253 is formed with a plurality of equiangular wall portions 254 for attachment to cup shaped casing 12. The end surface of each portion 254 is seated on the inner surface of end plate portion 121 of cup shaped casing 12 and is fixed on end plate portion 121 by a plurality of bolts 29, one of which is shown in FIG. 2. Sealing element 30 is placed between the end surface of each portion 254 and the inner surface of end plate portion 121 to surround each bolt 29 to prevent fluid leakage. Circular end plate 251 of fixed scroll 25 partitions the inner chamber of cup shaped casing 12 into discharge chamber 32 and suction chamber 33 in which spiral element 252 of fixed scroll 25 is located. Discharge chamber 32 is further defined by partition wall 253. Sealing element 31 is disposed within circumferential groove 255 of circular end plate 251 for sealing the outer peripheral surface of circular end plate 251 and the inner wall of cup shaped casing 12. Discharge chamber 32 is partitioned by partition wall 253 into center portion 321 and outer portion 322. Center portion 321 and outer portion 322 are connected to one another by connecting hole 259 formed through partition wall 253. Cup shaped casing 12 is provided with fluid inlet port 34 and fluid outlet port 35, which respectively are connected to discharge and suction chambers 32 and 33. A hole or discharge port 258 is formed through circular end plate 251 at a position near the center of spiral element 252; this discharge port is connected between the central fluid pocket of the spiral elements and discharge chamber 32.

Orbiting scroll 26, which is disposed in suction chamber 33, includes circular end plate 261 and wrap or spiral element 262 affixed to or extending from the one end surface of circular end plate 261. Spiral elements 252 and 262 interfit at an angle of 180° and a predetermined radial offset. The spiral elements define at least one pair of fluid pockets between their interfitting surfaces. Orbiting scroll 26 is connected to driving mechanism 27 and rotation preventing/thrust bearing device 28 which provide orbital motion of orbiting scroll 26 at a circular radius R or by rotation of drive shaft 13.

Rotation preventing/thrust bearing device 28 is located between the inner end surface of front end plate 11 and an axial end surface of circular end plate 261 of orbiting scroll 26. Rotation preventing/thrust bearing device 28 includes fixed race 281 attached to the inner end surface of front end plate 11, fixed ring 282 which covers the end surface of fixed race 281 and is attached to the inner end surface of front end plate 11 by pins, orbiting race 283 attached to the axial end surface of circular end plate 261, orbiting ring 284 which covers the end surface of orbiting race 283 and is attached to the axial end surface of circular end plate 261 by pins and a plurality of bearing elements, such as balls 285. A plurality of holes or pockets are formed through rings 282 and 284 with each ball 285 being placed in facing, generally aligned pockets. The rotation of orbiting scroll 26 is prevented by the interaction between balls 285 and the pockets. Additionally, the axial thrust load from orbiting scroll 26 is supported by front end plate 11 through balls 285.

The fluid or refrigerant gas which is introduced into suction chamber 33 from an external fluid circuit through inlet port 41 is taken into fluid pockets formed between spiral elements 252 and 262. The fluid pockets start at the outer end portions of both spiral elements. As orbiting scroll 26 orbits, fluid in the pockets is compressed and the compressed fluid is discharged into discharge chamber 32 through discharge port 258. From discharge chamber 32, the fluid is discharged through outlet port 42 to an external fluid circuit, for example, a cooling circuit.

Figure 3:
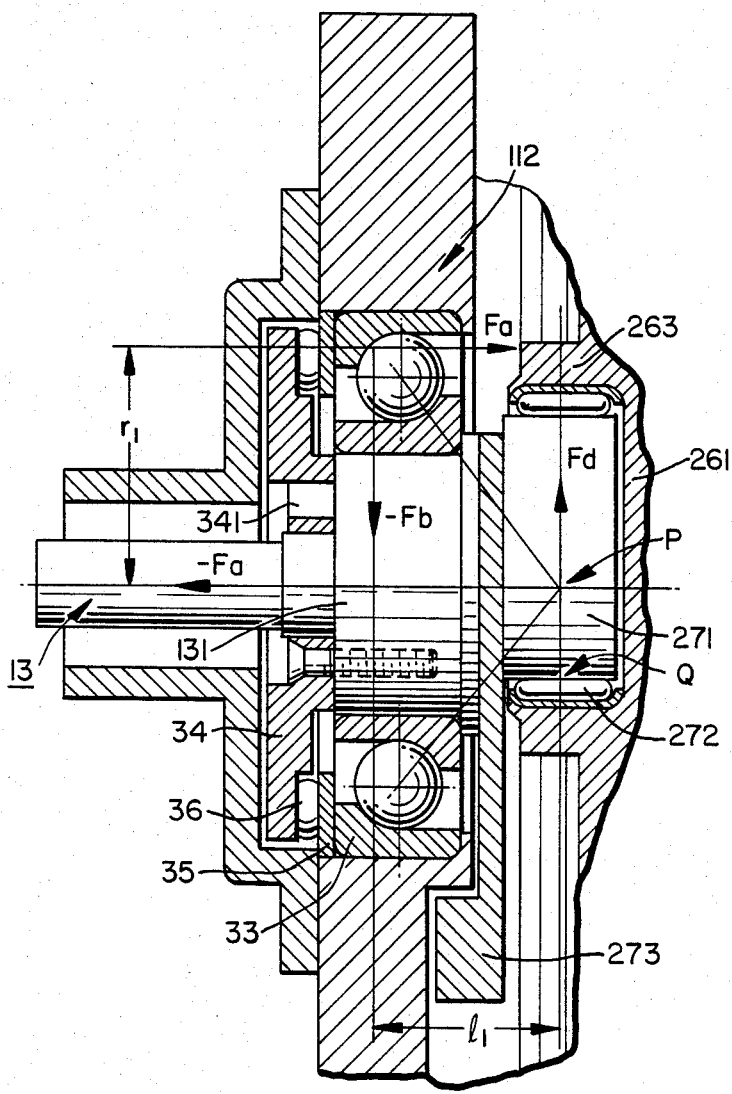
FIG. 3 is a vertical sectional view of the main portion of the drive shaft supporting mechanism of FIG. 2.

Referring now to FIGS. 2 and 3, the driving mechanism of orbiting scroll 26, particularly the supporting mechanism for the drive shaft, will be described in greater detail. Drive shaft 13 is provided with a disk shaped rotor 131 at its inner end portion. Disk shaped rotor 131 is rotatably supported by front end plate 11 through angular bearing 33 which is disposed within opening 111 of front end plate 11. A crank pin or drive pin (not shown) projects from an end surface of disk shaped rotor 131 and is radially offset from the center of drive shaft 13. Circular end plate 261 of orbiting scroll 26 is provided with tubular boss 263 axially projecting from an end surface of circular end plate 261 opposite to the side thereof from which spiral element 262 extends. A discoid or short axial bushing 271 is fitted into boss 263 and is rotatably supported therein by bearing 272. Balance weight 273, which is shaped as a portion of a disk or ring, extends radially from bushing 271 along the front surface thereof. An eccentric hole (not shown) is formed in bushing 271 radially offset from the center of bushing 271. The drive pin is fitted into the eccentric hole; a bearing may be placed between the eccentric hole and the drive pin. As a result, bushing 271 is driven by the revolution of the drive pin and this bushing rotates within boss 263 due to the action of bearing 272.

As best shown in FIG. 3, ring plate 34 is fitted against the end surface of disk shaped rotor 131 by a suitable fastening device. Thrust race 35 is attached to the outer end surface of angular bearing 33 facing ring plate 34. Thrust bearing 36 is placed between ring plate 34 and thrust race 35.

In the above construction, the pressure cone apex P of angular bearing 33 coincides in the axial direction with the driving point Q of orbiting scroll 26. The driving force acts at a contact point between the bearing ball of angular bearing 33 and an inner surface of angular bearing 33. The force on angular bearing 33 can be described by a radial force component $-Fb$ and a thrust force component $Fa$. The radial force component $-Fb$ is opposite in direction to the radial force component $Fd$ of the driving force acting at driving point Q. Furthermore, the thrust force component $-Fa$ of angular bearing 33 is carried by supporting plate 34 through thrust bearing 36. Therefore, drive shaft 13 can be supported by only one angular bearing 33. The force balance in this case is given by:

$$Fd - Fb = 0$$

$$Fd.1_f - Fa.r_1 = 0$$

where $1_f$ is the axial distance between the acting point Q of the driving force and the contact point of the bearing ball of angular bearing 33 and an inner surface of angular bearing 33, and $r_1$ is the radial distance between the center of drive shaft 13 and the mid-way point of thrust bearing 36, i.e., the contact point of the bearing ball and an inner surface of angular bearing 33.

Figure 4:
FIG. 4 is a vertical sectional view of a thrust race in the embodiment of FIG. 2.

If thrust race 35 is placed between thrust bearing 36 and the outer surface of angular bearing 33, and the thrust race has a slightly slanted surface to give spring force as shown in FIG. 4, thrust bearing 36 normally is pushed against ring plate 34. Therefore, any axial gap is completely absorbed by thrust race 35.

The driving mechanism described above includes balance weight 273 to cancel the dynamic imbalance caused by the centrifugal force of orbiting scroll 26. However, since the acting point of the centrifugal force of balance weight 273 is axially spaced from the acting point of the centrifugal force of orbiting scroll 26, a moment is created. As a result, in prior art apparatus, the driving mechanism usually is provided with an additional pair of balance weights to cancel this moment. One of these balance weights 37 (see FIG. 2) is fixed on the magnetic clutch and the other balance weight is disposed on drive shaft 13 near disk shaped rotor 131. However, if ring plate 34 is formed with a balance hole 341 as shown in FIG. 2, ring plate 34 is unbalanced so that the balance weight which normally is disposed on the drive shaft near disk shaped rotor 131 can be omitted.

Figure 5:
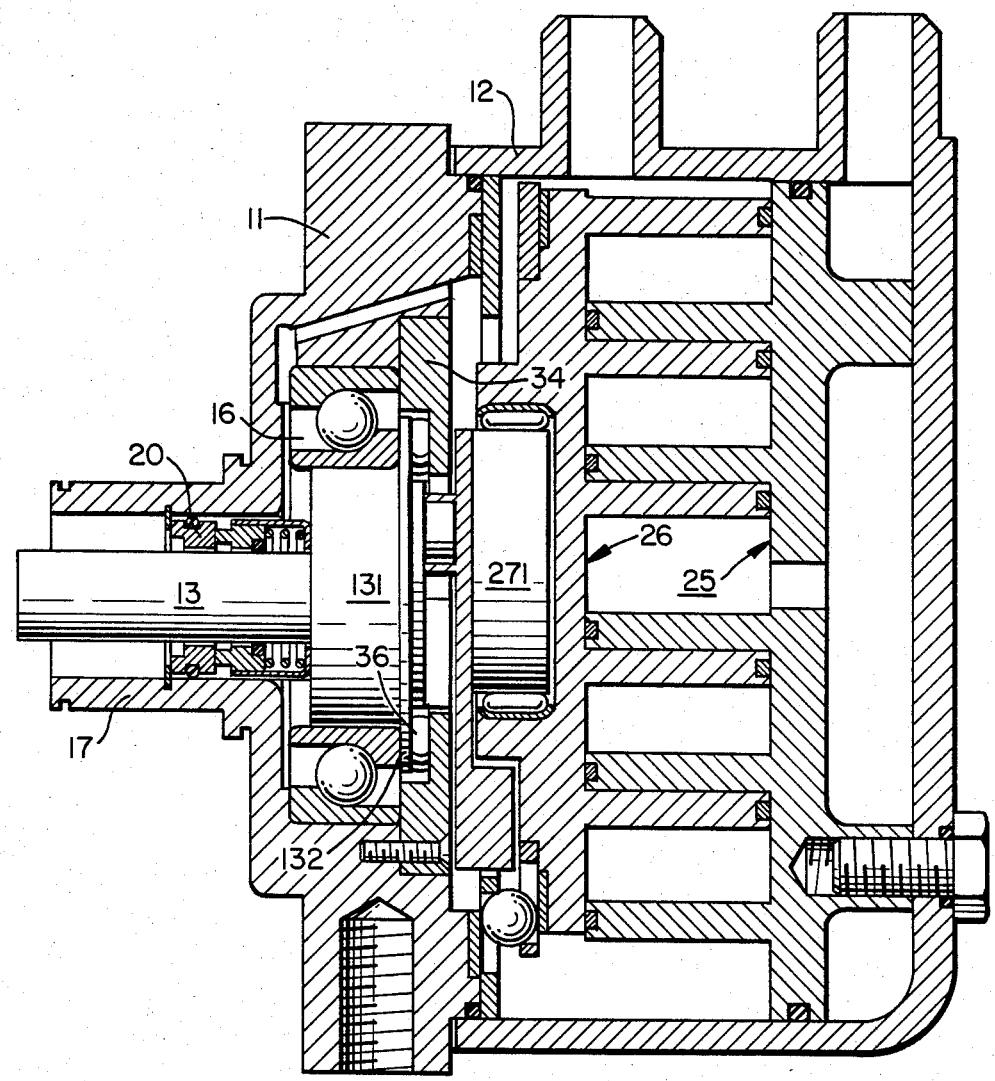
FIG. 5 is a vertical sectional view of the main portion of a drive shaft supporting mechanism according to another embodiment of this invention.

Referring to FIG. 5, another embodiment of the present invention is shown. This embodiment is directed to a modification of the thrust force supported mechanism of angular bearing 33. Disk shaped rotor 131 has radial flange portion 132 radially projecting from the inner end portion thereof to cover the axial end surface of the inner race of angular bearing 33. This flange portion 132 operates as the thrust race. Ring plate 34 is fixed on the inner side surface of front end plate 11 with an axial gap between ring plate 34 and radial flange portion 132. Thrust bearing 36 is placed between radial flange portion 132 of disk shaped rotor 131 and ring plate 34. In this construction, the driving mechanism for orbiting scroll 26 is assembled on one side of front end plate 11 so that sleeve 17 can be formed integral with front end plate 11.

With the above driving support mechanism, the drive shaft can be securely supported by only one annular bearing disposed within the front end plate. Therefore, the other support bearing used in the prior art apparatus, which normally was located between the outer end portion of the sleeve and the drive shaft, can be omitted. Accordingly, the radial dimensions of the sleeve can be reduced so that the outer diameter of the pulley of the magnetic clutch can be reduced, which in turn reduces the axial dimensions of the compressor. With the diameter and axial dimensions of the apparatus reduced, the apparatus is simpler in construction and lighter in weight.

The above invention has been described in detail in connection with preferred embodiments. These preferred embodiments are examples only and this invention is not restricted thereto. It will be easily understood by those skilled in the art that other variations and modifications can be easily made within the scope of this invention.

We claim:

1. In a fluid displacement apparatus including a housing having a front end plate, a fixed fluid displacement member fixedly disposed relative to said housing, an orbiting fluid displacement member disposed within said housing and interfitting with said fixed fluid displacement member to make a plurality of line contacts to define sealed off fluid pockets, and a driving shaft which protrudes through said front end plate and is rotatably supported by said front end plate through a bearing, said drive shaft being connected to said orbiting fluid displacement member to effect orbital motion of said orbiting fluid displacement member, the improvement comprising:
    an angular bearing which rotatably supports said drive shaft, the pressure cone apex of said angular bearing coinciding in the axial direction with the driving point of said orbiting fluid displacement member;
    a thrust race disposed on one axial end surface of said angular bearing;
    a ring plate disposed within said front end plate, said ring plate facing said thrust race at a predetermined axial distance; and
    a thrust bearing placed between said thrust race and said ring plate to carry the thrust force from said angular bearing.

2. The fluid displacement apparatus of claim 1 wherein said ring plate is disposed on said drive shaft and formed with a balance hole therein.

3. The fluid displacement apparatus of claim 2 wherein said thrust race is a unitary element disposed on the outer axial end surface of said angular bearing.

4. The fluid displacement apparatus of claim 1 wherein said ring plate is fixed on an inner side wall of said front end plate and said thrust race is formed integral with said drive shaft.

5. The fluid displacement apparatus of claim 4 wherein said thrust race is disposed on the inner axial end surface of said angular bearing.

6. A scroll type fluid displacement apparatus comprising:
    a housing having a front end plate;
    a fixed scroll fixedly disposed relative to said housing and having an end plate from which a first wrap extends into the interior of said housing;
    an orbiting scroll having an end plate from which a second wrap extends, said first and second wraps interfitting at an angular and radial offset to make a plurality of line contacts to define at least one pair of sealed off fluid pockets;
    a driving mechanism including a drive shaft extending through said front end plate and rotatably supported thereby to effect the orbital motion of said orbiting scroll so that the fluid pockets change volume upon orbital motion of said orbiting scroll;
    an angular bearing disposed within said front end plate to support said drive shaft, the pressure cone apex of said angular bearing coinciding with the driving point of said orbiting scroll;
    a thrust race disposed on one axial end surface of said angular bearing;
    a ring plate placed within said front end plate facing said thrust race at a predetermined axial distance; and
    a thrust bearing placed between said thrust race and said ring plate.

* * * * *